United States Patent

Priller et al.

(10) Patent No.: US 8,355,849 B2
(45) Date of Patent: Jan. 15, 2013

(54) SAFE CLUTCH POSITION

(75) Inventors: Heiko Priller, Karlsruhe (DE); Andreas Maxon, Karlsruhe (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 206 days.

(21) Appl. No.: 12/770,285

(22) Filed: Apr. 29, 2010

(65) Prior Publication Data

US 2010/0286879 A1 Nov. 11, 2010

(30) Foreign Application Priority Data

May 5, 2009 (DE) .................. 10 2009 020 018

(51) Int. Cl.
*G06F 7/00* (2006.01)
(52) U.S. Cl. ............... 701/67; 192/3.51; 475/43
(58) Field of Classification Search .................. 701/67; 192/3.51; 475/43; 477/5, 6
See application file for complete search history.

(56) References Cited

U.S. PATENT DOCUMENTS

| 5,411,124 | A | * | 5/1995 | Olson | 192/103 R |
| 7,124,009 | B2 | | 10/2006 | Kustosch et al. | |
| 7,574,296 | B2 | * | 8/2009 | Baehr et al. | 701/67 |
| 8,052,579 | B2 | * | 11/2011 | Eich et al. | 477/175 |
| 2004/0112158 | A1 | * | 6/2004 | Norum et al. | 74/335 |
| 2005/0101432 | A1 | * | 5/2005 | Pels et al. | 477/5 |
| 2006/0169077 | A1 | * | 8/2006 | Gitt | 74/330 |
| 2008/0230345 | A1 | * | 9/2008 | Minami | 192/30 W |
| 2008/0234099 | A1 | * | 9/2008 | Gierer et al. | 477/79 |
| 2008/0305931 | A1 | * | 12/2008 | Eich et al. | 477/174 |
| 2009/0105917 | A1 | * | 4/2009 | Schweizer | 701/67 |

FOREIGN PATENT DOCUMENTS

DE 102 48 195 A1 4/2004

* cited by examiner

*Primary Examiner* — Helal A Algahaim
(74) *Attorney, Agent, or Firm* — Simpson & Simpson, PLLC

(57) ABSTRACT

A procedure for monitoring a clutch position of a clutch which is arranged in a double clutch transmission of an automotive vehicle, wherein the clutch position is determined to be a safe position or a non-safe position.

10 Claims, 3 Drawing Sheets

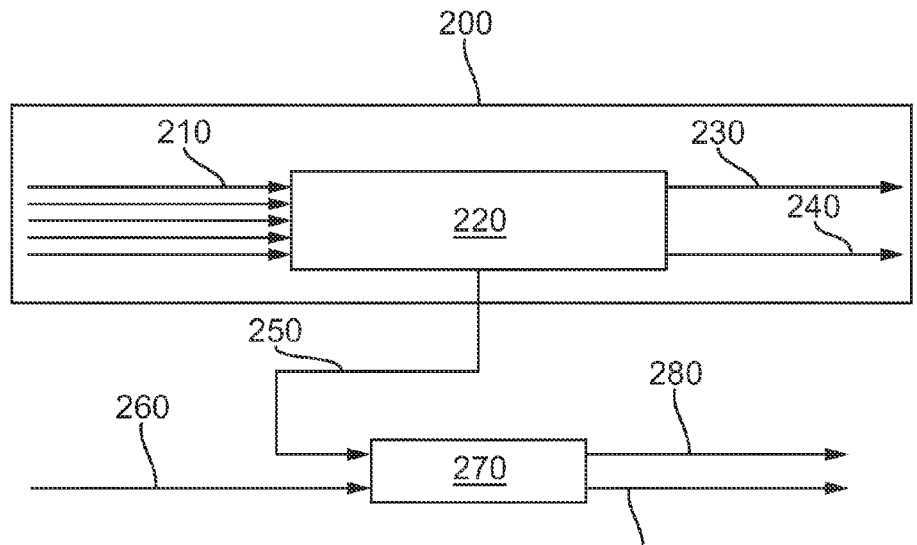
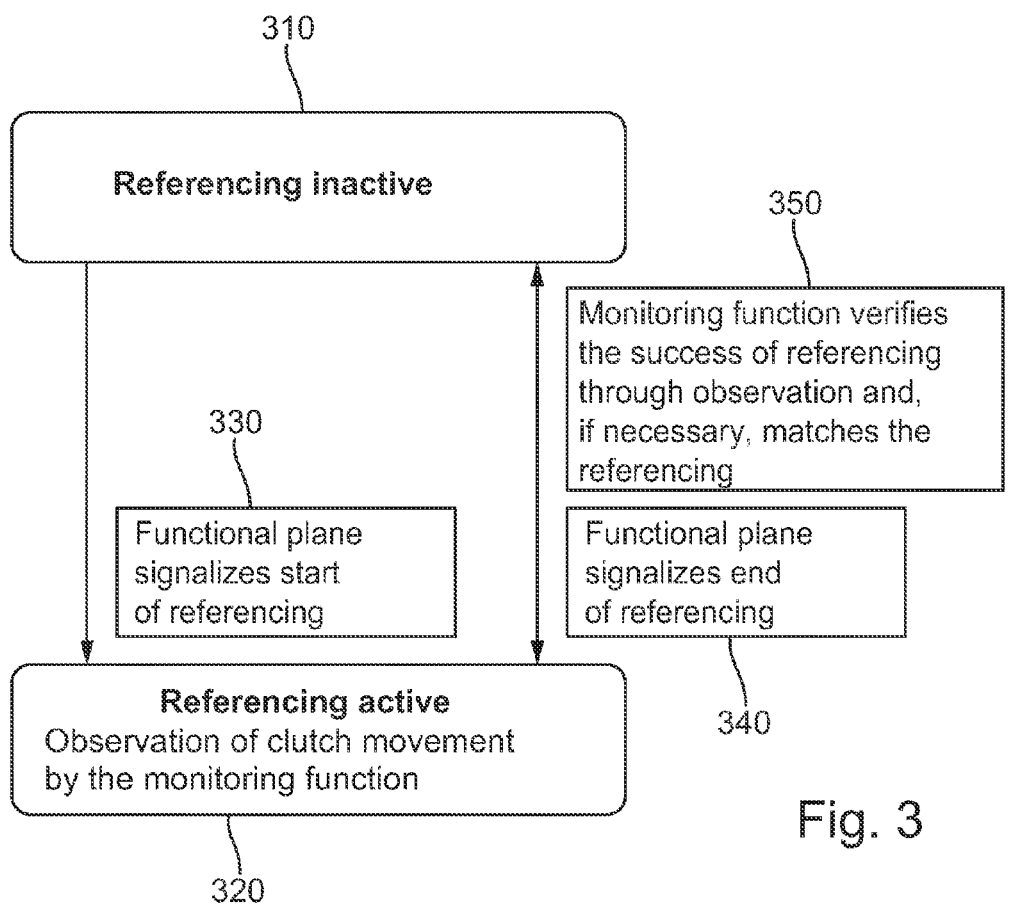
Fig. 2
Fig. 3

SAFE CLUTCH POSITION

CROSS-REFERENCE TO RELATED APPLICATIONS

This patent claims priority of German Patent Application No. 10 2009 020 018.5, filed on May 5, 2009, which application is incorporated herein by reference.

FIELD OF THE INVENTION

The invention broadly relates to clutches, more specifically to automobile clutches, and even more particularly to a method and device for safely operating a clutch of an automobile.

BACKGROUND OF THE INVENTION

The document DE 102 48 195 A1 discloses a procedure for monitoring a function of a control unit of an automotive vehicle.

The field of use of the invention is the control of double clutch systems and related, automated clutch systems in automobiles equipped with an incremental path measuring feature for determining the position of the clutch. The invention is a safety function and serves as a component part of a safety system guaranteeing the functional safety of double clutch systems and related, automated clutch systems.

Safety functions are built up so that, as long as no error is indicated by the safety function, there is no error in the procedure carried out and/or monitored by the safety function, and also no error in the system with which the procedure is carried out, because all actions or reactions of the system related to the procedure are taken into account.

Automated clutches, i.e. clutches operated by an actuator, are being increasingly used in modern automotive vehicles. The position of an operating member of the clutch, i.e. of the actuator is generally captured with the help of an incremental counter which supplies information directly only on the just traversed adjustment paths but no information on the absolute position of the operating member. For finding out the absolute position, a referencing is required in which a pre-defined operating position of the clutch is targeted by the actuator and the respective count of the incremental counter is read out.

A fundamental problem of such incremental path measurements is their dependence on the exact determination of the reference position. This problem is aggravated by the fact that errors in the operation of a vehicle have to be basically expected, so that the absolute position of the clutch actuator or operating member of the clutch and, thus also, the clutch torque produced by the actuator are no longer known in the electronic control device. Safety-critical events, for example an unintentional starting of the vehicle, can be the result. Of particularly critical importance for safety is an exact knowledge of the operating position of the clutch at any time in a double clutch transmission in which two clutches are required to be operated in exact coordination with each other.

BRIEF SUMMARY OF THE INVENTION

Important for the control of double clutch systems is the absolute position of the clutch with respect to a reference position, for instance a stop when the clutch is disengaged. With the help of a characteristic curve "torque against position" deposited in the system, the control device can thus set a desired, transmittable torque by targeting a position.

In double clutch systems equipped with incremental path measurement, however, it is not an absolute position that is determined but only differences in paths. For this reason, a so-called referencing, i.e. the targeting of the defined reference position must be carried out repeatedly during the operation of such systems. Starting from this reference position, the measured path differences are then added up. It is only in this way that the control device for systems with incremental path measurement recognizes the absolute clutch position.

Immediately upon occurrence of irregularities in the measurement of path differences or in the movement of the clutch, for instance, an unexpected blocking or a transient error in the path difference measurement, the absolute clutch position must be discarded, referencing re-started and the reference position learned anew. For making sure that the reference position is also actually reached during referencing, the entire path of movement of the clutch can be additionally traversed as a safety measure.

If, for any reason whatever, these procedures and strategies should lead to a faulty determination of the reference position or of the clutch position, this can result, in the worst case, in safety-critical situations. At any random position, the clutch would then transmit a torque different from the assumed torque. The double clutch system would then possess no functional safety.

The object of the invention is to provide measures for improving safety in the operation of clutches.

The object of the invention is achieved through a procedure, through a computer program product, and through a device.

A possible solution for preventing such faulty determination would be to configure all of the complex reference strategies and the position determination—with the concomitant higher requirements on development, testing and documentation—as a safety function in the framework of a safety system. But complexity and safety are competing system attributes and, in addition to the complexity-related costs, this fact alone is an argument against this possible solution.

It is indeed only for the sake of completeness that this solution has been mentioned.

The invention describes an alternative solution for preventing faulty determinations of the reference point and of the clutch position with the help of a simpler and more economic safety function and, consequently, for contributing to the realization of functional safety in double clutch systems.

The procedure of the invention comprises determining and monitoring a clutch position of a clutch which is arranged in a double clutch transmission of an automotive vehicle, said clutch comprising a clutch actuation system comprising an incremental path counter and said automotive vehicle comprising a control device. The clutch position is determined by a referencing procedure for referencing the clutch and by a position determining procedure for determining the clutch position, said referencing procedure and said position determining procedure being conceived as non-safety functions. The monitoring of the clutch position is effected through a monitoring module conceived as a safety function, through observation of the movement path of the clutch during referencing. This safety function determines and evaluates a reference position through observation, and further determines the clutch position, redundantly to the non-safety functions, out of the count of the incremental path counter and the determined reference position and evaluates it as a non-safe clutch position if:

the reference position determined and evaluated by the safety function is evaluated as non-safe;

an input signal indicates that the incremental path counter contains wrong values;

the value of the clutch position determined by the safety function lies outside of a plausible range;

the value of the clutch position determined by the safety function leaps up implausibly; the value of the clutch position determined by the non-safety functions and the value of the clutch position determined by the safety function of the monitoring module deviate too strongly from each other; or a referencing or plausibility check of the non-safety functions was terminated with errors; and, if this is not the case, evaluates the clutch position as a safe clutch position.

The safety function which determines a reference position through observation of the referencing, evaluates the reference position as safe if the observed referencing is carried out correctly, and evaluates the reference position as non-safe if the observed reference is carried out incorrectly.

A signal from a non-safety function during the execution of a referencing indicates to the monitoring module that a referencing is being carried out currently.

The observation of the referencing includes the observation of the minimal and maximal clutch position.

The observation of the referencing includes the observation of the minimal and maximal clutch position as also the observation of the triggering voltage of the clutch actuator.

If the clutch position is evaluated as a non-safe clutch position, a status flag indicating the correctness of the safe clutch position is set to INCORRECT.

If the clutch position is evaluated as a safe clutch position, a status flag indicating the correctness of the safe clutch position is set to CORRECT.

If the clutch position is evaluated as a non-safe clutch position, renewed referencing is initiated.

Renewed referencing is initiated through feedback of the evaluation of the clutch position as a non-safe clutch position via the monitoring module to a functional plane which comprises the non-safety functions.

The invention further proposes a computer program product comprising a computer program comprising software means for executing one of the aforesaid procedures when the computer program is run on a computer. Such a computer can be a part of the control unit.

The invention also proposes a device for determining and monitoring a clutch position of a clutch arranged in a double clutch transmission of an automotive vehicle for carrying out one of the aforesaid procedures, said clutch comprising a clutch actuation system equipped with an incremental path counter and said automotive vehicle comprising a control device. The control device is provided for enabling the clutch position to be determined by a referencing procedure for referencing the clutch and by a position determining procedure for determining the clutch position, said referencing procedure and said position determining procedure being conceived as non-safety functions. The control device is further provided for enabling monitoring of the clutch position through a monitoring module conceived as a safety function, through observation of the movement path of the clutch during referencing. This safety function determines and evaluates a reference position through observation and further determines the clutch position, redundantly to the non-safety functions, out of the count of the incremental path counter and the determined reference position and evaluates it as a non-safe clutch position if:

the reference position determined and evaluated by the safety function is evaluated as non-safe;

an input signal indicates that the incremental path counter contains wrong values; the value of the clutch position determined by the safety function lies outside of a plausible range;

the value of the clutch position determined by the safety function leaps up implausibly;

the value of the clutch position determined by the non-safety functions and the value of the clutch position determined by the safety function of the monitoring modules deviate too strongly from each other;

a referencing or plausibility check of the non-safety functions was terminated with errors; and, if this not the case, evaluates the clutch position as a safe clutch position (290).

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 2 is a schematic of a procedure according to the current invention;

FIG. 3 illustrates interaction of functional plane and monitoring function; and, FIG. 4 is an example of a correct and an incorrect referencing in progress;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
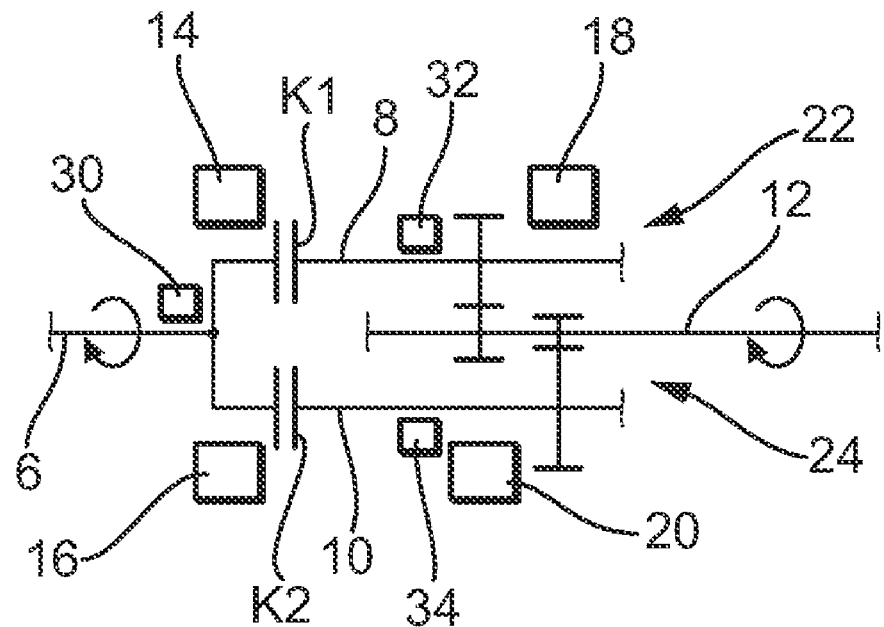
FIG. 1 is a block circuit diagram of a double clutch transmission together with an associated electronic control device.
Figure 1:
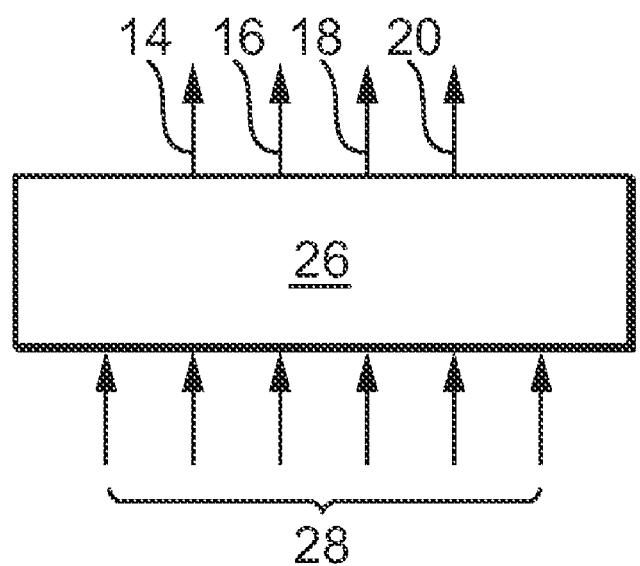

According to FIG. 1, a double clutch or parallel shift gearbox, known per se, comprises a drive shaft 6 which is driven, for instance, by an internal combustion engine and can be optionally connected rotationally fast to two input shafts 8 and 10. The torque flow from the drive shaft 6 into the input shafts 8 and 10 can be selectively controlled through respective clutches K1 and K2. Different transmission ratios can be set between the input shaft 8 and an output shaft 12 through gearwheel pairs, only one of which is illustrated. Similarly, it is possible to arrange different gearwheel pairs between the input shaft 10 and the output shaft 12, only one such gearwheel pair being illustrated. Actuators 14 and 16 are used to operate the clutches K1 and K2. For shifting the gearwheel pairs, for example, for connecting the gearwheel, which is arranged on the input shaft 8 or 10, rotationally fast to the respective input shaft 8 or 10, and which meshes with a respective gearwheel that is permanently connected rotationally fast to the output shaft 12, the invention provides actuators 18 and 20, each of which may comprise, for example, a shifting actuator and a selecting actuator. All in all, the input shaft 8 and the output shaft 12, as also the input shaft 10 and the output shaft 12 form respective partial transmissions 22 and 24 of the double clutch transmission.

Activation of the actuators 14, 16, 18 and 20 is effected through an electronic control device 26 with microprocessor and associated program and data memories each of whose outputs activates one of the actuators and whose inputs 28 are connected to sensors 30, 32 and 34, which capture the speed of rotation of the drive shaft 6, the input shaft 8 and the input shaft 10, and further connected to sensors for capturing the operation parameters of the vehicle drive train, for instance one sensor for capturing the speed of rotation of the driven wheels of the vehicle, one sensor for capturing the position of a gearbox selector lever, one sensor for capturing the position of a gas pedal etc. The control device 26 illustrated can be connected through a bus system to further control units of the vehicle, for instance an engine control unit with which an engine output adjuster is controlled. The actuators can be configured, for instance, as lever-type actuators that are activated, for example, by electro motors, the rotation of each electro motor being captured by an incremental counter (not illustrated).

An important factor for the function of a clutch is the torque that the clutch is able to transmit. This torque is saved in the memory of the control device 26 as a curve which shows the transmittable clutch torque as a function of the position of a clutch adjusting member, for instance a clutch lever. If there is a change in the functional state of the clutch due to wear and the like, this characteristic curve must be up-dated through adaptation methods. For this purpose, for instance, the scanning point of the clutch in driving operation must be verified and, if necessary, adapted to the changes determined in the clutch properties.

In the double clutch transmission illustrated in FIG. 1, a gear can be engaged in the respective partial transmission 22 or 24, whose clutch is disengaged, while the effective multiplication of the transmission is defined by that (active) partial transmission whose clutch is engaged. If, for example, a gear is engaged in the partial transmission 22 and the clutch K1 is in the engaged state, this gear is effective for the multiplication between the drive shaft 6 and the output shaft 12. It is possible, at the same time, to engage another desired gear in the other partial transmission 24. During switching of the transmission from an already engaged gear into the newly engaged gear, the clutch K1 must be disengaged and, for assuring a tensile force interruption-free connection between the drive shaft 6 and the output shaft 12, the clutch K2 must be simultaneously engaged. When the clutch K2 takes over the torque transmission, the transmission would be destroyed through over-determination of multiplications if, at the same time, at least one of the clutches did not slip. For this reason, a slipping state, in which at least one of the two clutches K1, K2 slips, is at least temporarily created if the clutches K1, K2 remain simultaneously engaged beyond their scanning point which is defined as the point from which onwards the clutch transmits torque as engagement progresses (the highest torque transmitted at the scanning point is at the most a few Newton meters).

The procedure of the invention is illustrated in FIG. 2 and can be described as follows.

A monitoring module 270—also called monitoring function—calculates a redundant "safe" clutch position 290—also called "safe" absolute position—out of the count of the incremental path counter 260 and a separate value for the zero point displacement—also called "safe" reference position or "safe" reference point 280. A status flag indicates additionally whether the "safe" absolute position is correct or if there is an error.

The flag related to the "safe" absolute position is set to CORRECT if a referencing of the incremental path measurement classified as correct has been carried out. This referencing in the form of a complex referencing strategy and position determination, both known from the prior art, are controlled by the functional plane, which is configured as a non-safety function, and monitored by the monitoring module. Control and monitoring are separated from each other, so that monitoring alone becomes substantially simpler.

Referencing itself can comprise several elements. On the one hand, it can comprise approaching a reference position, for instance, the stop in positive direction, or the stop in negative direction or the center between the stops in negative and positive direction. In the central region, a mechanical unevenness that can be run over easily and is always clearly detectable can be provided at a defined position in the path to be traversed, so that referencing can be effected with the help of this unevenness. On the other hand, referencing may also consist in examining the possible displacement path of the clutch. This displacement path results from the subtraction of the stop in positive direction minus the stop in negative direction. A combination of both procedures is likewise possible.

Figure 4:
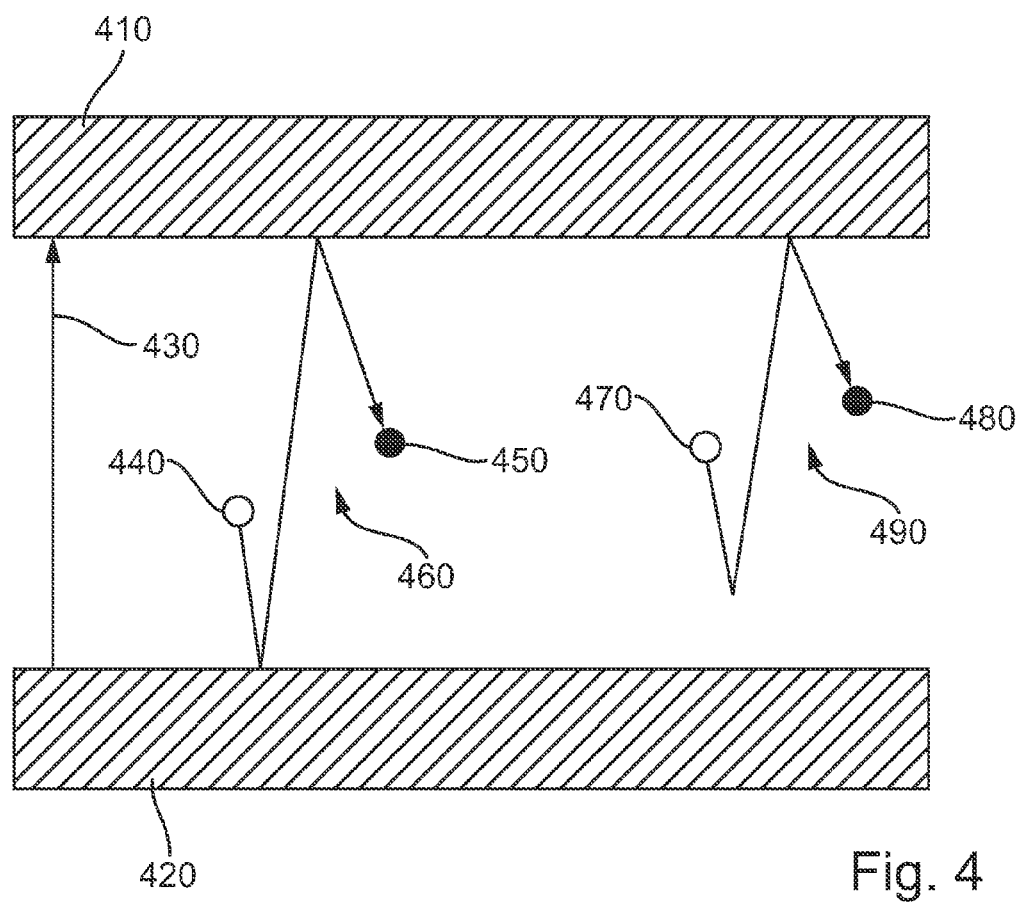

FIG. 4 shows two courses of referencing. The referencing 460 is progressing correctly, the referencing 490 is progressing incorrectly. Starting from the position 440 and 470 respectively, at first the negative or lower stop 420 is approached. According to the referencing course 460, the lower stop 420 is reached and this incremental position is compared to a position to be expected for the lower stop. According to the referencing course 490, however, the lower stop 420 is not reached as actuation is blocked by an obstacle such as dirt or a bracing in the actuation system. This incremental position at the obstacle is compared to the value of a position to be expected for the lower stop and gives an incorrect result. Following this, according to both referencing courses 460, 490, the upper stop 410 is approached. This is reached and this incremental position is compared to the position to be expected for the upper stop 410. This comparison leads in both cases to a correct result. Next, the courses of referencing 450, 480 continue towards the end.

In addition, alternatively, the difference between the real and the supposed upper stop and between the real and the supposed lower stop is determined and compared to a value to be expected for this clutch. In the case of the referencing course 460 this comparison leads to a correct result, whereas in the case of the referencing course 490 the comparison leads to an incorrect result, because, due to the obstacle, it was not the real but only the supposed lower stop that was reached.

The functional plane, or module, 200 indicates a straight-running referencing to the monitoring module 270 through a signal 250, 330. In this phase, the monitoring module observes the displacement path of the clutch actuation system and, upon completion of referencing, evaluates independently and thus redundantly to the functional plane 200, the correct execution of referencing. Depending on the strategy, the observation of referencing may be limited to the observation of the minimal or the maximal clutch position or, alternatively, it can also take into account a more complex observation. An example of this is the observation of the activation voltage of the clutch during referencing.

In addition to this, a feedback of the status of the "safe" clutch position by the monitoring module 270 to the functional plane 200 is effected in order to enable, upon loss of the "safe" clutch position, as rapid an initiation of referencing as possible and the earliest possible resumption of the normal driving operation, so that a shutdown of the system can be avoided. This signal is not shown in FIG. 2.

The flag symbolizing the "safe" absolute position is set to INCORRECT for example if:

an input signal indicates that the incremental path counter currently contains wrong values, or the "safe" clutch position is situated outside of a plausible range, of the "safe" clutch position leaps up implausibly, or the clutch position of the functional plane and that of the monitoring module deviate too strongly from each other, or a referencing or plausibility check of the functional plane was terminated with errors.

How large the plausible range is or when the leap is implausible must be defined depending on the type of clutch and clutch actuation system employed in each case.

FIG. 3 shows a concept of a possible embodiment of the monitoring function.

When a function of the functional plane causes an execution of referencing, the functional plane signalizes the start 330 of referencing to the monitoring module. Upon termination of referencing, the functional plane signalizes the end 340 of referencing to the monitoring module. On the basis of observation, the monitoring function verifies the correctness of referencing and if it was correctly performed, the monitoring function matches the referencing 350 by transmitting "safe" reference point and "safe" clutch position to the functional plane.

The invention describes a simple and economic realization of a safety function which protects the parameter that is important for double clutch systems comprising incremental path measurement, i.e. the reference point, from erroneous determination. It forms a part of a safety system that guarantees the functional safety of double clutch systems.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMERALS

6 Drive shaft
8 Input shaft
10 Input shaft
12 Output shaft
14 Actuator
16 Actuator
18 Actuator
20 Actuator
22 Partial transmission
24 Partial transmission
26 Control device
28 Inputs
30 Sensor
32 Sensor
34 Sensor
K1 Clutch
K2 Clutch
200 Functional plane
210 Input signals
220 Complex referencing strategy and position determination as a non-safety function
230 Reference point
240 Clutch position
250 Referencing active
260 Input signals
270 Monitoring module with safety function
280 Safe reference point
290 Safe clutch position
310 Referencing inactive
320 Referencing active
330 Procedure step
340 Procedure step
350 Procedure step
410 Upper stop
420 Lower stop
430 Clutch position
440 Start of referencing
450 End of referencing
460 Evaluation through monitoring function: CORRECT
470 Start of referencing
480 End of referencing
490 Evaluation through monitoring function: INCORRECT

We claim:

1. A procedure for determining and monitoring a clutch position of a clutch which is arranged in a double clutch transmission of an automotive vehicle, said clutch comprising a clutch actuation system comprising an incremental path counter and said automotive vehicle comprising a control device including a functional module associated with operation of the vehicle and a monitoring module for checking safe operation of the vehicle, the procedure comprising:

determining, using the control device and the functional module, a first clutch position by a referencing procedure for referencing the clutch and by a position determining procedure for determining the first clutch position;

observing, using the control device and the monitoring module, a movement path of the double clutch during the referencing procedure;

determining, using the control device and the monitoring module, a reference position;

determining, using the control device and the monitoring module, a second clutch position, redundantly to the functional module, out of the count of the incremental path counter and the determined reference position;

evaluating, using the control device and the monitoring module, the first clutch position as a non-safe clutch position if:

the reference position determined and evaluated by the monitoring module is evaluated as non-safe; or an input signal indicates that the incremental path counter contains wrong values; or the value of the second clutch position determined by the monitoring module lies outside of a range; or the value of the second clutch position determined by the monitoring module leaps up implausibly, or the value of the first clutch position determined by the functional module and the value of the second clutch position determined by the monitoring module deviate too strongly from each other; or a referencing or plausibility check of the none-safety functions was terminated with errors; or, evaluating, using the control device and the monitoring module, the first clutch position as a safe clutch position if:

the reference position determined and evaluated by the monitoring module is not evaluated as non-safe; and an input signal indicates that the incremental path counter does not contain wrong values; and the value of the second clutch position determined by the monitoring module does not lie outside of a range; and the value of the second clutch position determined by the monitoring module does not leap up implausibly, and the value of the first clutch position determined by the functional module and the value of the second clutch position determined by the monitoring module do not deviate too strongly from each other; and a referencing or plausibility check of the functional module was not terminated with errors.

2. The procedure according to claim 1, further comprising using the control device and the monitoring module to evaluate the reference position as safe if the observed referencing was carried out correctly and to evaluate the reference position as non-safe if the observed referencing was carried out incorrectly.

3. The procedure according to claim 1, further comprising using the control device and the monitoring module to receive a signal from the functional module during the execution of a referencing to indicate to the monitoring module that the referencing is in progress.

4. The procedure according to claim 1, wherein the observation of referencing comprises observation of the minimal and the maximal clutch position.

5. The procedure according to claim 1, wherein the observation of referencing comprises observation of the minimal and the maximal clutch position as also the observation of the activation voltage of the clutch actuator.

6. The procedure according to claim 1, further comprising, if the clutch position is evaluated as a non-safe clutch position, setting, using the control device and the monitoring module, a status flag indicating the correctness of the safe clutch position to INCORRECT.

7. The procedure according to claim 1, further comprising, if the clutch position is evaluated as a safe clutch position, setting, using the control device and the monitoring module, a status flag indicating the correctness of the safe clutch position to CORRECT.

8. The procedure according to claim 1, further comprising, if the clutch position is evaluated as a non-safe clutch position, using the control device and the functional module to initiate a renewed referencing.

9. The procedure according to claim 8, wherein a renewed referencing is initiated by a feedback of the evaluation as a non-safe clutch position sent by the monitoring module to the functional module.

10. A device for determining and monitoring a clutch position of a clutch which is arranged in a double clutch transmission of an automotive vehicle, said clutch comprising a clutch actuation system comprising an incremental path counter and said automotive vehicle comprising a control device, including a functional module associated with operation of the vehicle and a monitoring module for checking safe operation of the vehicle arranged to:

determine, using the functional module, a first clutch position by a referencing procedure for referencing the clutch and by a position determining procedure for determining the first clutch position;

observe, using the monitoring module, a movement path of the double clutch during referencing;

determine, using the monitoring module, a reference position; determine, using the monitoring module, a second clutch position, redundantly to the functional module, out of the count of the incremental path counter and the determined reference position;

evaluate, using the control device and the monitoring module, the second clutch position as a non-safe clutch position if:

the reference position determined and evaluated by the monitoring module is evaluated as non-safe; or an input signal indicates that the incremental path counter contains wrong values; or the value of the second clutch position determined by the monitoring module lies outside of a range; or the value of the second clutch position determined by the monitoring module leaps up implausibly, or the value of the first clutch position determined by the functional module and the value of the second clutch position determined by the monitoring module deviate too strongly from each other; or a referencing or plausibility check of the none-safety functions was terminated with errors; or, evaluate, using the monitoring module, the first clutch position as a safe clutch position if:

the reference position determined and evaluated by the monitoring module is not evaluated as non-safe; and an input signal indicates that the incremental path counter does not contain wrong values; and the value of the second clutch position determined by the monitoring module does not lie outside of a range; and the value of the second clutch position determined by the monitoring module does not leap up implausibly, and the value of the first clutch position determined by the functional module and the value of the second clutch position determined by the monitoring module do not deviate too strongly from each other; and a referencing or plausibility check of the functional module was not terminated with errors.

* * * * *